(12) United States Patent
Keil

(10) Patent No.: US 7,317,846 B2
(45) Date of Patent: Jan. 8, 2008

(54) PROPAGATION DELAY VARIATION FOR A DISTRIBUTED OPTICAL MODULATOR DRIVER

(75) Inventor: Ulrich Dieter Felix Keil, Broenshoej (DK)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/394,801

(22) Filed: Mar. 31, 2006

(65) Prior Publication Data

US 2007/0237444 A1 Oct. 11, 2007

(51) Int. Cl.
*G02F 1/035* (2006.01)
(52) U.S. Cl. ............... 385/3; 385/1; 385/2; 385/24
(58) Field of Classification Search ............ 385/1–3, 385/24
See application file for complete search history.

(56) References Cited

U.S. PATENT DOCUMENTS 7,079,717 B2 * 7/2006 Liu et al. ............... 385/14

OTHER PUBLICATIONS

Dean Samara-Rubio, et al., "Customized Drive Electronics to Extend Silicion Optical Modulators to 4 Gb/s", Journal of Lightwave Technology, vol. 23, No. 12., Dec. 2005. 10 pages.
Ansheng Liu, et al., "Recent Development in silicon photonics: 2.5 Gb/s silicon optical modulator and silicon Raman laser", Intel Corporation, pp. 1-14.
Ling Liao, et al., "High speed silicon Mach-Zehnder Modulator", Intel Corporation, pp. 1-7—2005.
Ling Liao, et al., "2.5 Gb/s Silicon-based Optical Modulator", Intel Corporation, pp. 1-5—2004.

* cited by examiner

*Primary Examiner*—Jennifer Doan
(74) *Attorney, Agent, or Firm*—Blakley, Sokoloff, Taylor & Zafman LLP

(57) ABSTRACT

Propagation delay variations for a distributed optical modulator driver are described. In one example, a system includes a signal distribution network, a plurality of output driver stages coupled to the signal distribution network, a waveguide coupled to the outputs of the output drive stages to receive a voltage across the waveguide, and a plurality of delay cells between the distribution network and the plurality of output driver stages to apply a differential delay to the output stages.

16 Claims, 6 Drawing Sheets

PROPAGATION DELAY VARIATION FOR A DISTRIBUTED OPTICAL MODULATOR DRIVER

FIELD

The present description relates to optical waveguides for optical communications and, in particular, to applying a variable delay to an electrical distribution network to compensate for the low index of refraction of a waveguide.

BACKGROUND

Optical waveguide modulators, commonly used in Mach-Zehnder lithium niobate modulators and electro-absorption modules, among others, will normally have electro-optic material embedded in an electrical waveguide with the modulating electrical field penetrating the electro-optic material of the optical waveguide. The electrical waveguide will typically have a characteristic impedance of about 50 Ohms and can be driven by a 50 Ohm driver.

Semiconductor based waveguide modulators (MZM) represent a much higher capacitive load (~10 pF/mm). Such high loads cannot easily be integrated in 50Ω transmission lines. The resulting transmission line impedances are typically <10Ω in turn resulting in a slow electrical wave with a strong velocity mismatch between optical and electrical wave. The low impedance therefore requires a segmented connection of the modulator driver to the waveguide. The velocity mismatch directly impacts the rise and fall times of the optical signal, which, in turn, directly impacts the speed at which the optical signal may be modulated. Velocity matching between electrical and optical wave may significantly improve the data rates that an optical signal can carry.

It is very difficult to change the inductance per unit length of a semiconductor waveguide by changing its geometry, that is the shape, depth, width, or length of the waveguide. The inductance is only weakly dependent on the geometry of the waveguide and normally will remain within a range of 1 to 1.3 nH/mm. Changing the waveguide geometry also has other significant effects on the modulator and the geometry cannot be changed freely without considering the many other factors that are affected.

BRIEF DESCRIPTION OF THE DRAWINGS

Embodiments of the present invention will be understood more fully from the detailed description given below and from the accompanying drawings of various embodiments of the invention. The drawings, however, should not be taken to be limiting, but are for explanation and understanding only.

DETAILED DESCRIPTION

In one embodiment, the present invention allows the electrical wave velocity to be matched to the optical wave velocity when combining distributed drivers with distributed optical modulators.

Figure 1:
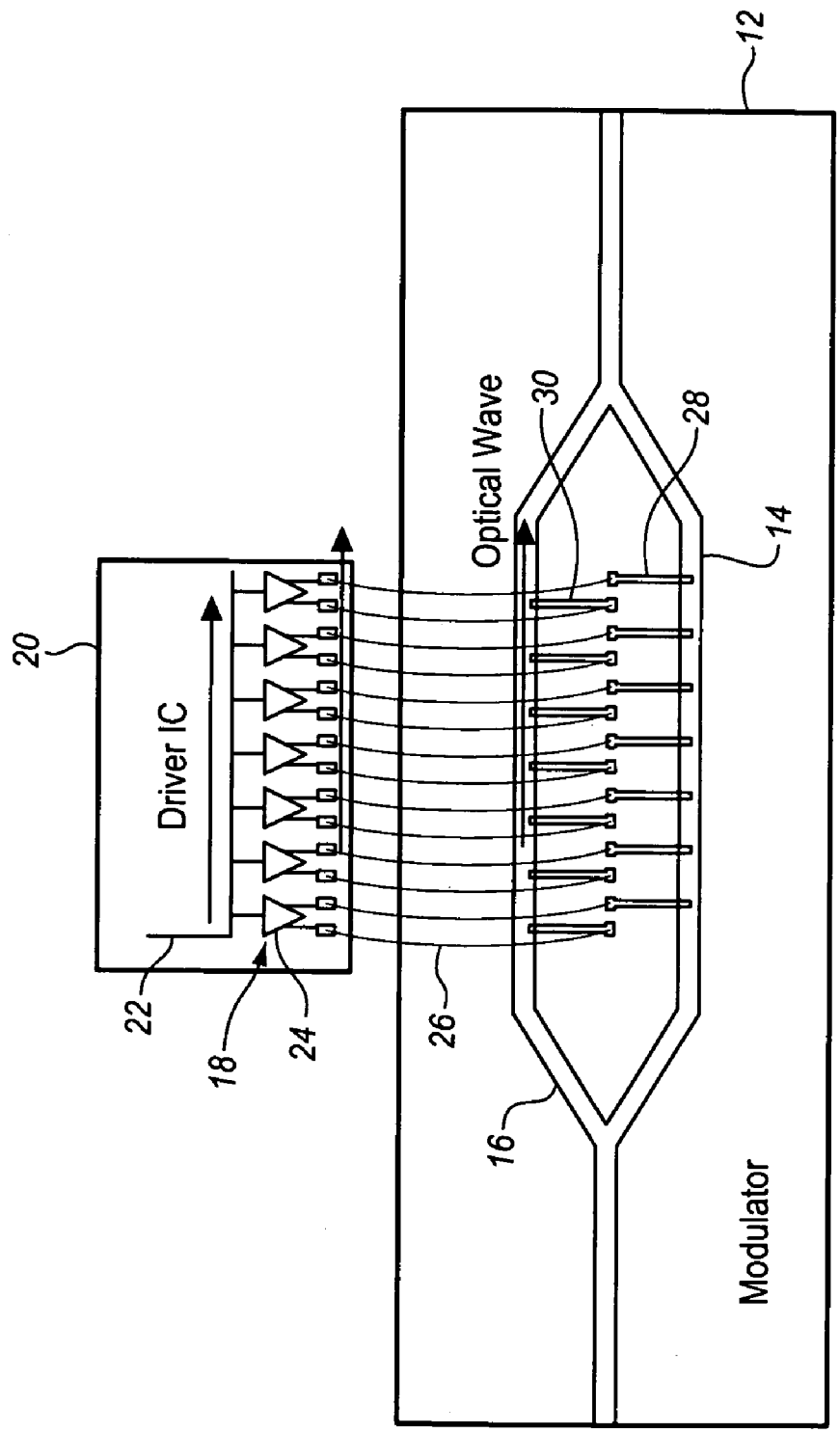
FIG. 1 is a functional electric diagram of a Mach Zehnder modulator with an attached driver circuit.

FIG. 1 shows a semiconductor Mach-Zehnder modulator 12 (realized in a CMOS process). It includes parallel waveguide paths 14, 16. The paths meet at the physical ends of the substrate where they may be coupled to optic fibers or other components (not shown). The phase velocity of the electrical wave through both parallel paths is determined by a distribution network 18. The distribution network is formed as part of an integrated circuit (IC) on a separate silicon substrate 20. The separate IC contains all of the electronics for the driver for the MZM and drives the two arms of the modulator in a differential configuration.

The distribution network of FIG. 1 is shown diagrammatically as an internal distribution network 22 coupled to a series of line drivers 24. Each output driver stage has a positive and a negative output. These outputs are coupled to wire lines 26. The positive outputs couple to a sequence of coupling pads 28 that are evenly spaced along one of the waveguides 14. The negative outputs couple to a similar sequence of coupling pads 30 that are evenly spaced along the other parallel waveguide 16.

The velocity of the electrical wave is determined by the distribution network, the tapped transmission line 22 of FIG. 1. Instead of a tapped transmission line, a tree structure or a variety of other structures may be used. Other structures may be used to the inherent or even arbitrary delay of a tapped line. This may simplify the operation and calibration of the delay stages. While it may be possible to adjust the values of all of the components of the distribution network to eliminate this delay, the absolute delay is difficult to model and it is different for different modulators. In the version of FIG. 1, the delay is difficult to adjust on the fly for use with different modulators. For purposes of this description, the signal at the output will be considered a wave for a fine segmentation.

Figure 2:
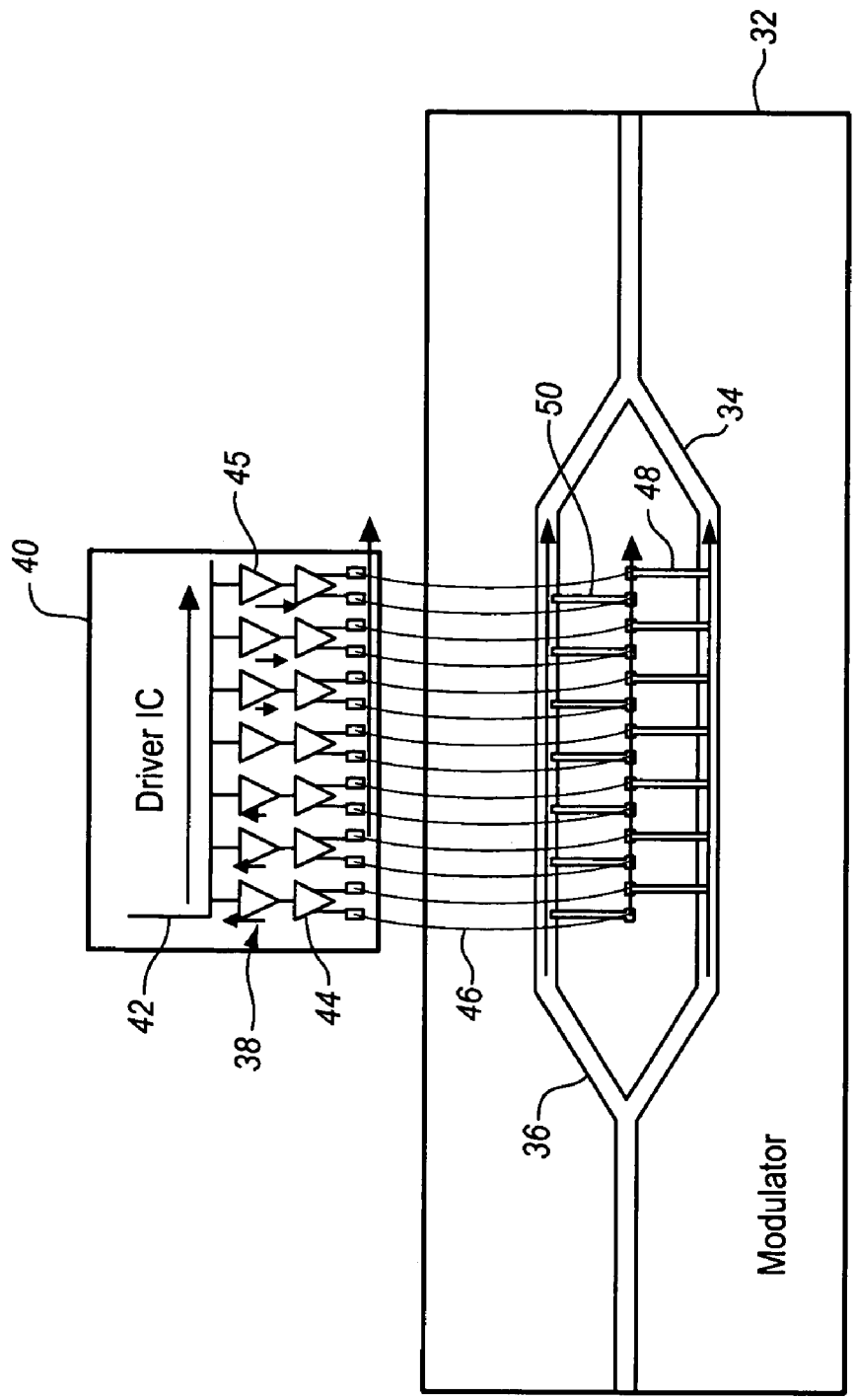
FIG. 2 is a functional electrical diagram of a Mach Zehnder modulator with an attached variable delay driver circuit according to an embodiment of the invention.

In FIG. 2, adjustable delay cells 45 are added between the signal distribution network 42 and the output driver stages 44. As in FIG. 1, a Mach Zehnder modulator 32 is coupled to a driver IC 40. The MZM has parallel waveguide paths 34, 36. The distribution network has a signal distribution line 42 coupled across a series of output drivers 44. The positive and negative outputs are coupled to wire lines 46 which are coupled to a sequence of coupling pads 48, 50 that are evenly spaced along the parallel waveguides 44, 46.

The amplitude of the delay change $\Delta\tau$ may be varied linearly along the output driver chain 44 by the delay cells 45. If the optical wave front travels from left to right across FIGS. 1 and 2, then the electric field wave front will also travel from left to right. The delay stages may be staged to progressively add a greater shift to the electric wave front. In the time domain, this translates to the first stage having the shortest delay and the last stage having the longest delay. FIG. 2 shows an arrow next to each delay stage. The arrows indicate the amplitude and sign of the variable delay. This will push the wave forward at the beginning and then pull it back as it propagates. In other words, the electrical wave velocity at the output will be lower than at the input. If the variation of the delay stages is large enough, the direction of the electrical wave may even be reversed.

The velocity of the optical wave is determined at least in part by the refractive index of the optical waveguide. A driver with an adjustable delay may be used to accomplish one or more different purposes depending on the application. The variable delay stages may be used for fine tuning to compensate for velocity mismatches between the electrical wave and the optical wave as mentioned above. The fine tuning may be used to compensate for different MZMs, production variations or changes due to environmental conditions and degradation over time. The fine tuning may also be used to compensate for temperature drift.

The variable delay stages may be set for use in a system with other components to provide pre-emphasis before the light is injected into an optic fiber in order to compensate for the dispersion within the fiber. The variable delay stages may further be used to adjust for different modulators, or modulators made from different semiconductor materials, for example compound semiconductors, such as GaAs or InP, lithium niobate, silicon-based materials and other materials. The variable delays may be used to adjust the phase velocity to accommodate modulators that have an optical wave guided formed of a material with a low refractive index, such as some silicon oxides.

The variable delay stages may also be used to allow the modulator to operate with light traveling in either direction. For the FIG. 2 example, the arrows indicate that the delay stages offer a large positive delay on the left that transitions to a large negative delay on the right. The settings may be reversed to provide the same effect for light traveling in the opposite direction.

In a MZM with a doped polysilicon waveguide that is 3.5 mm long the optical wave may take about 41 ps to travel the length of the waveguide. The electrical wave may take about 29 ps. The electrical wave leads the optical wave by about 12 ps. Varying a single emitter-follower current in an adjustable delay stage, a 13 ps delay of the electrical wave may be produced. This is sufficient to compensate for the low refractive index of the waveguide material.

Figure 3:
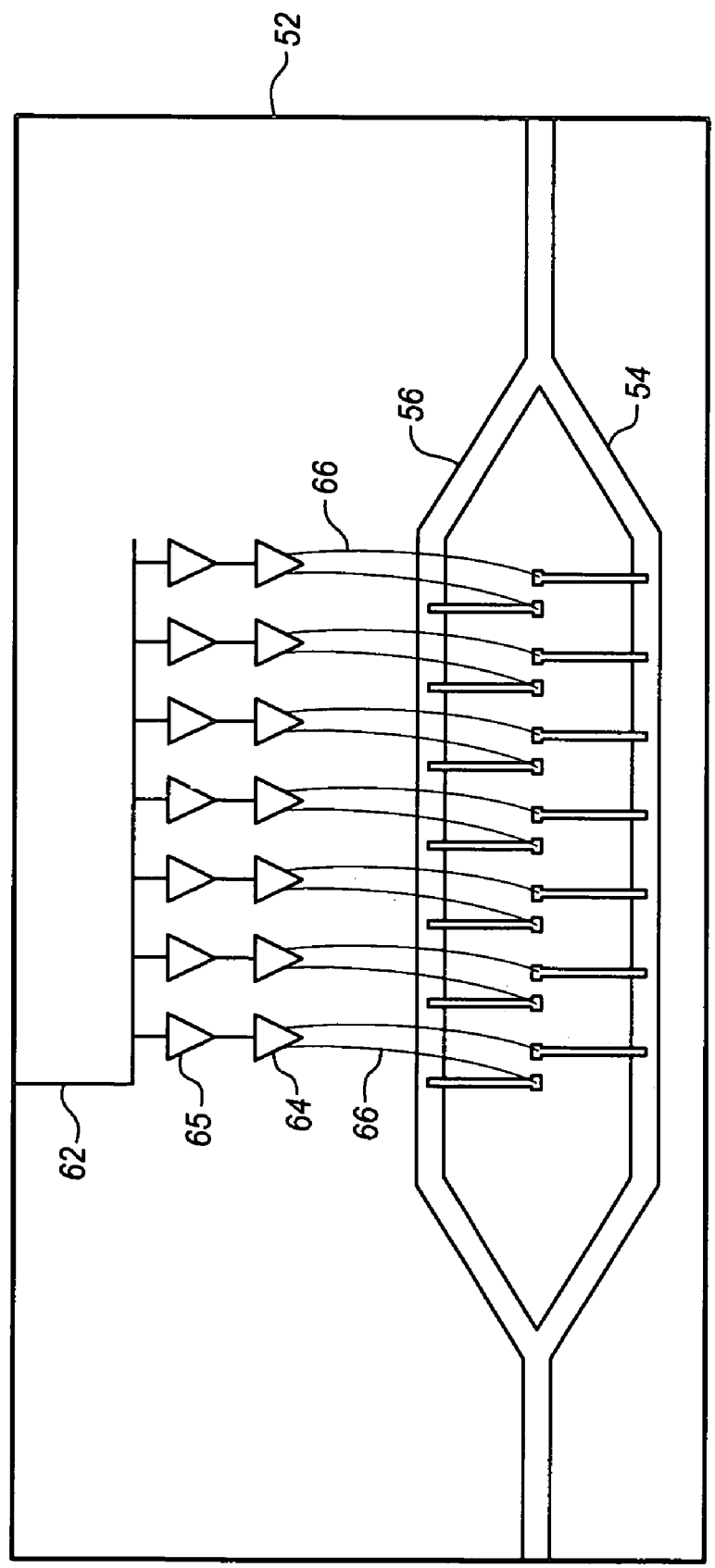
FIG. 3 is a functional electrical diagram of a Mach Zehnder modulator with an integrated variable delay driver circuit according to an embodiment of the invention.

FIG. 3 shows a MZM built on silicon substrate 52 together with the electrical distribution network. Adjustable delay cells 65 between a signal distribution network 62 and output driver stages 64 may be used to compensate for the low refractive index of a polysilicon or other waveguide 54, 56 formed on the silicon substrate. The distribution network has a signal distribution line 62 coupled across the series of output drivers 64. The positive and negative outputs may be coupled directly to the parallel waveguides 64, 66 at evenly spaced intervals. In FIG. 3, the delay stages may be formed on the silicon substrate for very little cost and allow the silicon waveguide to be constructed on the same chip, making for a compact, efficient package.

Figure 4:
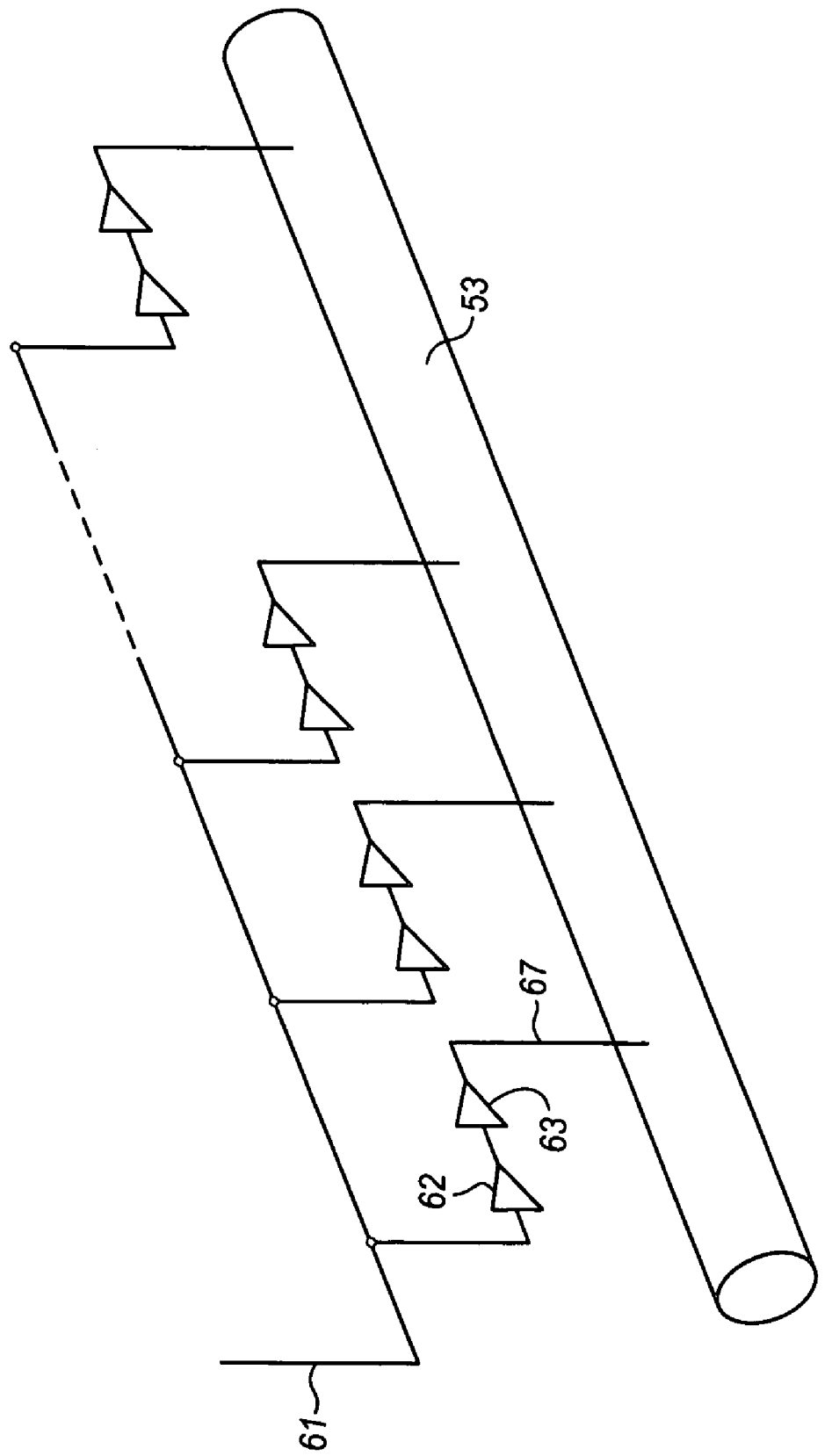
FIG. 4 is a functional electrical diagram of a waveguide and a modulator driver circuit according to an embodiment of the invention.

FIG. 4 shows a single waveguide built on silicon substrate 53 together with a simple electrical distribution network 61. FIG. 4 illustrates that embodiments of the present invention are not limited to differential compensated waveguides or MZMs, but may be applied to a wide range of different optical devices. Such a single waveguide may find use in an electro-absorption modulator and a wide variety of other devices. In FIG. 4, adjustable delay cells 62 between a signal distribution network 61 and output driver stages 63 compensate for the velocity mismatch between the waveguide and the electronics or induce some other effect. The output drivers 63 are coupled through lines 67 to the waveguides 53 at evenly spaced intervals. In FIG. 4, the delay stages may be formed on the same substrate as the waveguide or on a separate component.

Figure 5:
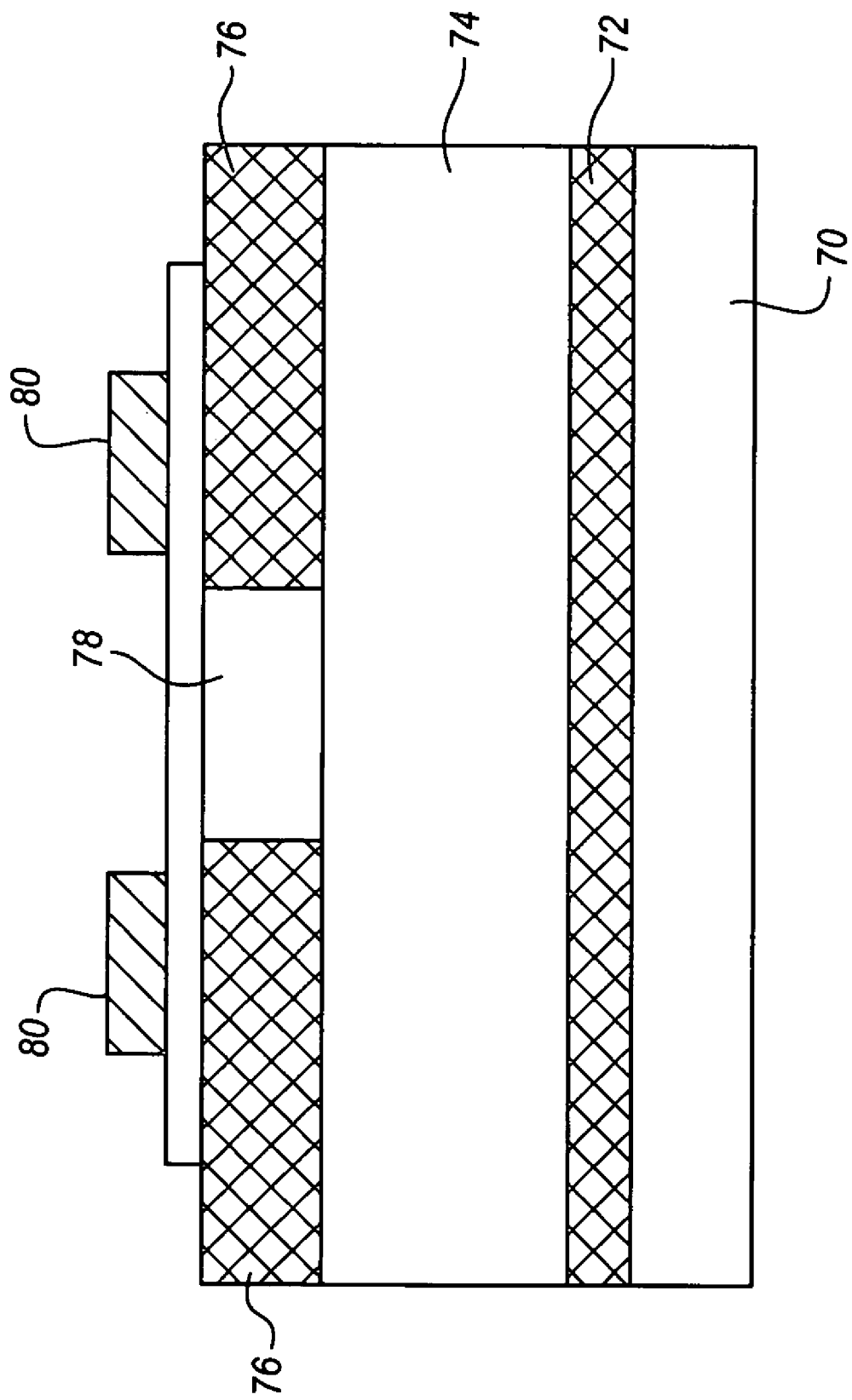
FIG. 5 is a cross-sectional view of a waveguide with a capacitive modulator according to an embodiment of the invention.

FIG. 5 shows a cross sectional view of a silicon waveguide to which a transistor driver is coupled as may be used for the waveguides of FIGS. 1, 2, 3, and 4. The system is built on a silicon substrate 70. This is covered with a layer of buried oxide 72, A layer of doped silicon 74, in this example n-doped silicon is formed over the oxide. Two long ridges 76 of oxide are then formed over the doped silicon. The two ridges form a channel between them. The channel is filled with a layer of doped polysilicon to form the waveguide 78 and the transistor gate. The waveguide is p-doped in this example of the n-doped silicon layer.

A top undoped polysilicon layer is formed over the tops of the oxide ridges and metal contact pads 80, for example aluminum pads, are formed on either side of the waveguide channel over the polysilicon layer. The two oxide ridges form a source and a drain for a transistor across the gate waveguide. The voltage between the two oxide layers generates an electric field across the waveguide. By placing the metal contacts to the side rather than on top of the rib waveguide 78, the optical absorption due to the metal contacts is almost eliminated.

The oxide regions 76 on either side of the waveguide maintain optical confinement and prevent the optical field from penetrating into the areas where the metal contacts are located. To make Ohmic contacts to the metal, both the crystalline silicon slab and poly-silicon may have a surface doping concentration of $1 \times 10^{19}$ cm-3 The particular structure of the waveguide and integrated transistor may be modified to suit different applications and to accommodate advancements and improvements.

The active drivers may further be used to adjust for different modulators, or modulators made from different semiconductor materials, for example any compound semiconductors, such as InPh or GaAs, among others. The active drivers may be set with values to compensate waveguides with a wide range of different capacitances or impedances and to accommodate modulators that have an optical waveguide formed of other materials to suit a variety of different applications.

Figure 6:
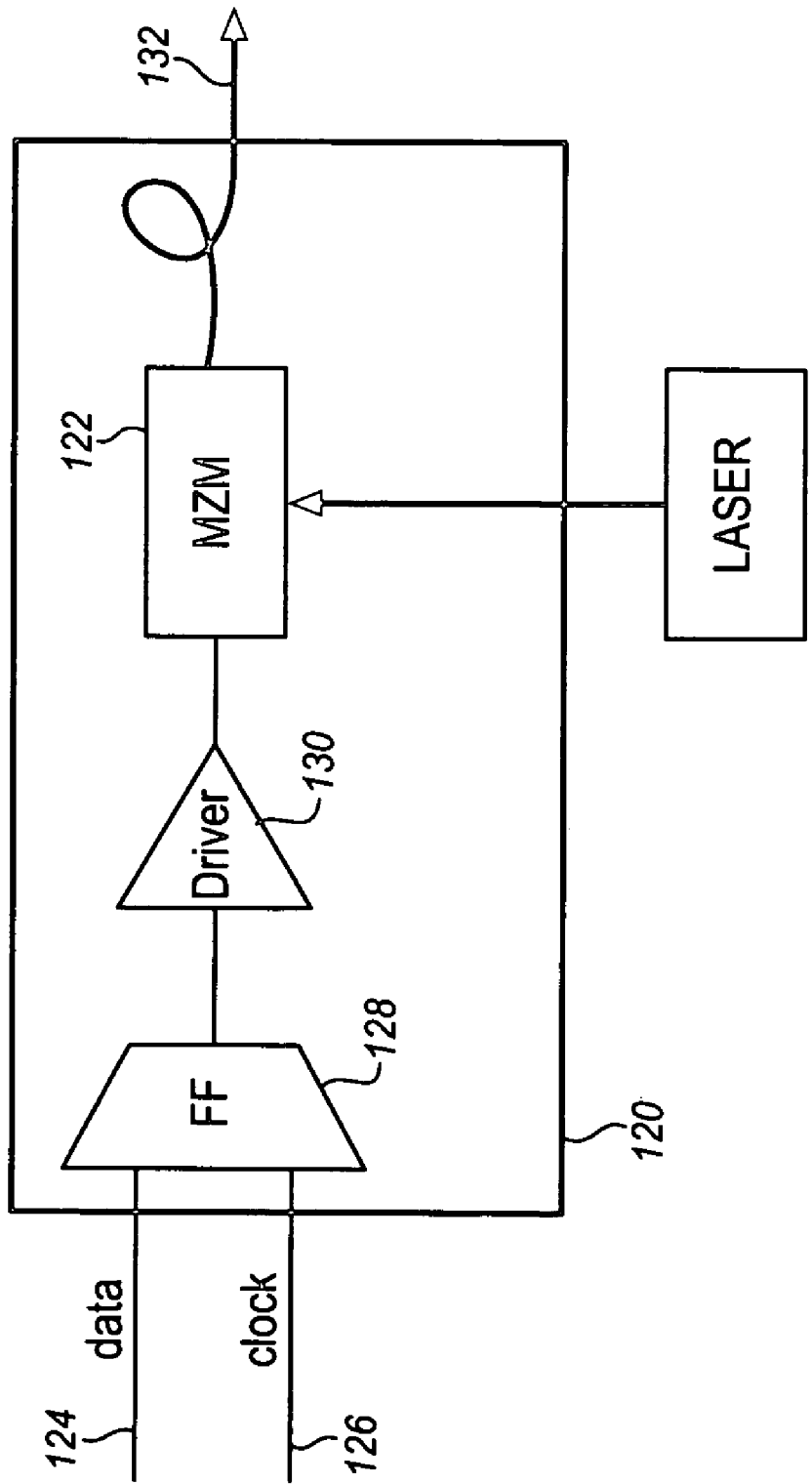
FIG. 6 is a block diagram of an optical transmitter incorporating a Mach Zehnder modulator according to an embodiment of the invention.

FIG. 6 is block diagram of portion of a transmitter, useful for example with an optical transceiver. Such a transceiver may use a Mach Zehnder modulator 122 such as the MZM of FIG. 5, although such modulators may be applied to many other applications. In the example of FIG. 6, the transceiver 120 receives data 124 and a clock line 126 from an external source or an internal VCO (voltage controlled oscillator). The data signal is retimed with the clock signal in a flip-flop, amplified in a driver 130 and then fed as a modulation signal to the MZM 122. The clock line 126 may come from an external source, such as a router, network node or other device. A regulated laser light source 134 is fed to the waveguides of the MZM to be modulated by the data signal. The laser may be part of the module, or placed on the same chip, or it may part of a be a central optical power supply. The combined signal is then provided to the optic fiber output 132 of the transmitter.

A lesser or more complicated waveguide, delay and driver circuits, modulator or transmitter may be used than those shown and described herein. The specific design of any of the illustrated electrical circuits may be modified to suit a particular application. Therefore, the configurations may vary from implementation to implementation depending upon numerous factors, such as price constraints, performance requirements, technological improvements, or other circumstances. Embodiments of the invention may also be applied to other types of systems that use different inputs and outputs than those shown and described herein.

Many of the methods and apparatus are described in their most basic form but steps may be added to or deleted from any of the methods and components may be added or subtracted from any of the described apparatus without departing from the basic scope of the present invention. It will be apparent to those skilled in the art that many further modifications and adaptations may be made. The particular embodiments are not provided to limit the invention but to illustrate it. The scope of the present invention is not to be determined by the specific examples provided above but only by the claims below.

What is claimed is:

1. An optical modulator comprising:
  a signal distribution network;
  a plurality of output driver stages coupled to the signal distribution network;
  a waveguide coupled to the outputs of the output drive stages to receive a voltage across the waveguide; and
  a plurality of adjustable delay cells between the distribution network and the plurality of output driver stages to apply a differential delay to the output stages, the adjustable delay cells being set to compensate for the optical transmission properties of the waveguide.

2. The modulator of claim 1, wherein the distribution network comprises a tapped transmission line.

3. The modulator of claim 1, wherein the delay cells vary in delay linearly along the distribution network.

4. The modulator of claim 1, wherein the plurality of output driver stages form an output driver chain and wherein the delay cells vary in delay linearly along the distribution network.

5. The modulator of claim 1, wherein each of the output driver stages produce a negative output and a positive output, wherein the waveguide has two discrete parallel paths and wherein the negative outputs are coupled to one path and the positive outputs are coupled to the other parallel path.

6. The modulator of claim 1, wherein the driver stages, delay cells and waveguide are integrated on a single silicon substrate.

7. The modulator of claim 1, wherein the phase modulators each comprise a pair of charge carrying oxide layers.

8. The modulator of claim 1, wherein the waveguide is formed of a silicon material, the phase modulators are formed of an oxide silicon and the local amplifiers are formed of a metal oxide semiconductor material.

9. The modulator of claim 1, wherein the waveguide is formed of doped polysilicon and the phase modulators comprise a plurality of complementary metal oxide semiconductor transistors with gates across the waveguide.

10. An optical transmitter comprising:
  an input data multiplexer;
  an optical source;
  a plurality of output driver stages coupled to the signal distribution network;
  a waveguide coupled to the outputs of the output drive stages to receive a voltage across the waveguide; and
  a plurality of adjustable delay cells between the distribution network and the plurality of output driver stages to apply a differential delay to the output stages, the adjustable delay cells being set to compensate for the optical transmission properties of the waveguide.

11. The transmitter of claim 10, wherein the delay cells vary in delay linearly along the distribution network.

12. The transmitter of claim 10, wherein the phase modulators each comprise a pair of charge carrying oxide layers.

13. The modulator of claim 10, wherein the waveguide is formed of doped polysilicon and the phase modulators comprise a plurality of complementary metal oxide semiconductor transistors with gates across the waveguide.

14. A method comprising:
  forming a polysilicon optical waveguide on a silicon substrate;
  forming a plurality of oxide phase modulators on the silicon substrate to drive an electrical field into the waveguide;
  forming a signal distribution network on the silicon substrate;
  forming a plurality of output driver stages on the silicon substrate coupled to the signal distribution network; and
  forming a plurality of adjustable delay cells on the silicon substrate between the distribution network and the plurality of output driver stages to apply a differential delay to the output stages, the adjustable delay cells being set to compensate for the optical transmission properties of the waveguide.

15. The method of claim 14, wherein forming the distribution network comprises forming a tapped transmission line.

16. The method of claim 14, wherein forming the polysilicon waveguide further comprises forming the waveguide over a layer of doped silicon and doping the polysilicon complementary to the doped silicon layer.

* * * * *